(12) United States Patent
Fujibayashi et al.

(10) Patent No.: US 8,150,194 B2
(45) Date of Patent: Apr. 3, 2012

(54) IMAGE ADJUSTMENT AMOUNT DETERMINATION DEVICE, IMAGE ADJUSTMENT AMOUNT DETERMINATION METHOD, IMAGE ADJUSTMENT AMOUNT DETERMINATION PROGRAM, AND IMAGE PROCESSING DEVICE

(75) Inventors: Akira Fujibayashi, Yokosuka (JP); Choong Seng Boon, Yokohama (JP); Sadaatsu Kato, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1111 days.

(21) Appl. No.: 11/945,509

(22) Filed: Nov. 27, 2007

(65) Prior Publication Data

US 2008/0123985 A1 May 29, 2008

(30) Foreign Application Priority Data

Nov. 28, 2006 (JP) ................ P2006-320584

(51) Int. Cl.
*G06K 9/40* (2006.01)
(52) U.S. Cl. ........ 382/260; 382/264; 382/190; 382/236; 382/107; 382/294
(58) Field of Classification Search ................. 382/190, 382/264, 107, 260, 236, 294
See application file for complete search history.

(56) References Cited

U.S. PATENT DOCUMENTS

| | | | | |
|---|---|---|---|---|
| 3,924,266 A * | 12/1975 | Harwood | .................. | 348/630 |
| 5,089,887 A * | 2/1992 | Robert et al. | ................. | 348/699 |
| 5,103,305 A * | 4/1992 | Watanabe | ................. | 382/236 |
| 5,245,589 A * | 9/1993 | Abel et al. | ................. | 367/136 |
| 5,418,619 A * | 5/1995 | Wedam et al. | ................ | 386/304 |
| 5,491,519 A | 2/1996 | Kim | | |
| 5,687,249 A * | 11/1997 | Kato | ................. | 382/104 |
| 6,040,865 A * | 3/2000 | Kato et al. | ................. | 375/240.16 |
| 6,415,041 B1 | 7/2002 | Oami et al. | | |
| 6,628,713 B1 * | 9/2003 | Kojima et al. | ................. | 375/240.16 |
| 6,654,504 B2 * | 11/2003 | Lubin et al. | ................. | 382/254 |

(Continued)

FOREIGN PATENT DOCUMENTS

CN 1112769 A 11/1995

(Continued)

OTHER PUBLICATIONS

Sharpeneing image—vision., Tatsuto et al. SPIE vol. 5666, 0277-786X, Jan. 17, 2005, pp. 83-94.*

(Continued)

*Primary Examiner* — Jayesh A Patel
(74) *Attorney, Agent, or Firm* — Oblon, Spivak, McClelland, Maier & Neustadt, L.L.P.

(57) ABSTRACT

An image adjustment amount determination device comprises: processing target image determination means for receiving an input video signal which comprises a plurality of frame images and which is input from the outside, for dividing the input video signal into the plurality of frame images, and for determining a processing target image which is to be the target of image processing and one or more neighboring images which are located in the vicinity of the processing target image in the display order, on the basis of a predetermined criterion from the plurality of frame images; image characteristic extraction means for extracting a feature quantity relating to the neighboring images thus determined; and image adjustment amount determination means for determining at least one adjustment amount of the amplitude and bandwidth of a spatial frequency component relating to the processing target image thus determined, on the basis of the feature quantity that relates to the neighboring images thus extracted.

7 Claims, 9 Drawing Sheets

U.S. PATENT DOCUMENTS

| | | | | |
|---|---|---|---|---|
| 7,197,075 | B2 * | 3/2007 | Akimoto et al. | 375/240.16 |
| 7,454,078 | B2 * | 11/2008 | Ramamurthy | 382/254 |
| 7,769,089 | B1 * | 8/2010 | Chou | 375/240.29 |
| 2003/0189980 | A1 * | 10/2003 | Dvir et al. | 375/240.16 |
| 2004/0218830 | A1 * | 11/2004 | Kang et al. | 382/274 |
| 2005/0036704 | A1 * | 2/2005 | Dumitras et al. | 382/260 |
| 2006/0045365 | A1 * | 3/2006 | De Haan et al. | 382/236 |
| 2008/0123985 | A1 * | 5/2008 | Fujibayashi et al. | 382/254 |

FOREIGN PATENT DOCUMENTS

| | | | |
|---|---|---|---|
| EP | 1 363 236 A2 | 11/2003 | |
| EP | 1 927 951 A2 | 6/2008 | |
| GB | 2 316 828 A | 3/1998 | |
| JP | 10-98727 A | 4/1998 | |
| JP | 2001-94832 A | 4/2001 | |
| JP | 2001-245298 A | 9/2001 | |

OTHER PUBLICATIONS

Sharpeneing image—vision., Tatsuto et al., SPIE vol. 5666, 0277-786X, Jan. 17, 2005, pp. 83-94.*

Akira Fujibayashi, et al., "A Masking Model for Motion Sharpening Phenomenon in Video Sequences", IEICE Transactions on Fundamentals of Electronics, Comunications and Computer Sciences, Engineering Sciences Society, vol. E91-A, No. 6, ISSN: 0916-8508, XP001514045, Jun. 1, 2008, pp. 1408-1415.

Stefan Winkler, "Issues in Vision Modeling for Perceptual Video Quality Assessment", Signal Processing, vol. 78, No. 2, ISSN: 0165-1684, XP004180219, pp. 231-252.

Bernd Girod, "The Information Theoretical Significance of Spatial and Temporal Masking in Video Signals", Proceedings of the SPIE, vol. 1077 Human Vision, Visual Processing and Digital Display, XP008024985, ISSN: 0277-786X, Jan. 1, 1989, pp. 178-187.

European Office Action issued on Jun. 22, 2011 in corresponding European Application No. 07 121 566.9.

Japanese Office Action issued on Jun. 28, 2011 in corresponding Japanese Application No. P2006-320584 (with an English Translation).

Office Action issued Dec. 29, 2011 in Chinese Patent Application No. 200710196037.6 filed Nov. 28, 2007. (with English Translation).

* cited by examiner

IMAGE ADJUSTMENT AMOUNT DETERMINATION DEVICE, IMAGE ADJUSTMENT AMOUNT DETERMINATION METHOD, IMAGE ADJUSTMENT AMOUNT DETERMINATION PROGRAM, AND IMAGE PROCESSING DEVICE

BACKGROUND OF THE INVENTION

1. Field of the Invention

A present invention relates to an image adjustment amount determination device, an image adjustment amount determination method and an image adjustment amount determination program for determining an image adjustment amount, and an image processing device that is constituted comprising the image adjustment amount determination device.

2. Related Background Art

'Video' is constituted by consecutive 'frame images' and each of the frame image is single still image. Video processing, which includes video capture, storage, transmission, display, encoding and decoding and so forth generally targets video for which the definition of the individual frame images (called simply 'definition' hereinbelow) is constant or changes gradually. However, the human eye is able to clearly distinguish differences in the definition of an image. Therefore, differences in definition are often directly linked to an evaluation of the quality of an image and, generally speaking, a high-definition image is evaluated as being of high quality.

Here, even when individual frame images are low-definition images (blurred images), in cases where the respective frame images are displayed as continuous video, an illusory phenomenon whereby this video is seen clearly by the person viewing the video as a video with improved definition of frame image and whereby the video is perceived as having smoother motion occurs is mentioned in 'Takeuchi, T. & De Valois, K. K. (2005), "Sharpening image motion based on spatio-temporal characteristics of human vision", Human Vision and Electronic Imaging X' (called simply 'Document 1' hereinbelow). Such an illusory phenomenon is referred to as the 'motion sharpening' phenomenon (also referred to as the 'motion-based definition phenomenon').

The Document 1 mentions this motion sharpening phenomenon as probably being due to the magnitude of the motion of the photographed object contained in the frame images and the high frequency component of the spatial frequency. Furthermore, the Document 1 mentions that there are cases where, in the motion sharpening phenomenon, the definition of low-definition images is perceived as being higher than the actual definition when viewed as video as a result of frame images of a higher definition than a predetermined criterion ('high-definition images' hereinbelow) being inserted in video that is constituted by frame images of a lower definition than the predetermined criterion (called 'low-definition images' hereinbelow). In cases where 50% of the frame images constituting the video are constituted by high-definition images in particular, the definition perceived by the human eye viewing the video is sometimes seen as being no different from the definition when a video whose frame images are all constituted by high definition images is seen (that is, the illusion is that the definition that is perceived subjectively does not change). Thus, the motion sharpening phenomenon is also said to be a phenomenon whereby the subjective quality is maintained by mixing high-definition images and low-definition images.

Therefore, the present applicant considered whether this motion sharpening phenomenon was a type of masking phenomenon in a temporal direction that is also confirmed via a video scene change or the like. That is, high-definition images were thought to reduce (that is, mask) the difficulty in viewing low-definition images.

OOYAMA Tadasu, IMAI Shogo, WAKE Tenji, 'Sensory Perception Psychology Handbook New Edition' Seishin Shobo Co. Ltd, ISBN: 4414305039, Page 664' (called simply 'Document 2' hereinbelow) mentions the fact that the effects of masking phenomena generally change as a result of the relationship of the sizes of the spatial frequency components between mask simulation (simulation providing a masking effect) and target simulation (simulation receiving masking effect) and the display timing of the mask simulation and target simulation (Forward masking phenomenon and Backward masking phenomenon).

Furthermore, TAKEUCHI Tatsuto, 'Motion-based video definition', (Search date: Oct. 26, 2006), Internet <URL: http://www.ntt.co.jp/journal/0510/files/jn200510050.pdf> (called simply 'Document 3' hereinbelow) mentions the approach that the motion sharpening phenomenon is not a high-order visual perception mechanism such as memory or learning but rather a nonlinear motion of the mechanism that exists in the initial visual system of the human eye is brought about. Based on this fact, the present applicant considered the effect of both 'motion' between the frame images constituting the video and the 'average luminance' which has an extremely large influence on the initial visual system to be large in the motion sharpening phenomenon for which the subjective quality is preserved. Further, the 'size of the spatial frequency component' and the 'temporal interval of the stimuli' which determine the effect of the masking effect were also thought to be related to this phenomenon, and, in focusing on the characteristics of this video, the motion sharpening phenomenon was perceived to be a type of masking phenomenon.

However, in the Document 1 and the Document 3, the 'size of motion' and 'constitution of the spatial frequency component' are reported as feature quantities of video related to the motion sharpening phenomenon. However, the quantitative relationship between the feature quantities (the 'size of motion' and 'constitution of the spatial frequency component') and the effect of the motion sharpening phenomenon is not clear. Furthermore, with regard to the definition that is perceived in cases where the respective frame images are viewed as continuous video, in cases where the spatial frequency of the respective frame images is reduced (that is, the definition is reduced), although the results of experiments related to the degree of spatial frequency which the human eye is able to perceive have been reported, the conditions for preserving the definition perceived by the human eye (referred to as the 'subjective definition' hereinbelow) (that is, the conditions for preserving the subjective quality of video) have not been clarified.

Therefore, the present applicant arrived at the present invention because, when the relationship, in this motion sharpening phenomenon, between the feature quantity contained in the target video and the minimum spatial frequency component of low-definition images in which the subjective definition is preserved was calculated experimentally, it became clear that the minimum spatial frequency component of low-definition images in which the subjective definition is preserved differs depending on the relationship between the feature quantities of the low-definition images and high-definition images which are adjacent in their display order to the low-definition images.

SUMMARY OF THE INVENTION

An object of the present invention is to suitably determine the adjustment amount relating to a processing target image contained in the video for preserving the subjective quality of the video, on the basis of the feature quantities of frame images that differ from the processing target image.

In order to resolve the above problem, an image adjustment amount determination device according to the present invention is an image adjustment amount determination device, comprising processing target image determination means for receiving an input video signal which comprises a plurality of frame images and which is input from the outside, for dividing the input video signal into the plurality of frame images, and for determining a processing target image which is to be the target of image processing and one or more neighboring images which are located in the vicinity of the processing target image in the display order, on the basis of a predetermined criterion from the plurality of frame images; image characteristic extraction means for extracting a feature quantity relating to the neighboring images determined by the processing target image determination means; and image adjustment amount determination means for determining at least one adjustment amount of the amplitude and bandwidth of a spatial frequency component relating to the processing target image determined by the processing target image determination means, on the basis of a feature quantity that relates to the neighboring images extracted by the image characteristic extraction means.

According to this image adjustment amount determination device, the processing target image determination means receives an input video signal which comprises a plurality of frame images and which is input from the outside, divides the input video signal into the plurality of frame images, and determines a processing target image which is to be the target of image processing and one or more neighboring images which are located in the vicinity of the processing target image in the display order, on the basis of a predetermined criterion from the plurality of frame images; the image characteristic extraction means extracts a feature quantity relating to the neighboring images thus determined; and the image adjustment amount determination means determines at least one adjustment amount of the amplitude and bandwidth of a spatial frequency component relating to the processing target image determined, on the basis of the feature quantity that relates to the neighboring images thus extracted. As a result, an adjustment amount relating to a processing target image contained in the video that serves to maintain the subjective quality of the video (at least one adjustment amount of the amplitude and bandwidth of the spatial frequency component) can be suitably determined on the basis of a feature quantity of frame images which differ from the processing target image.

Furthermore, in the image adjustment amount determination device according to the present invention, the image characteristic extraction means is desirably constituted to further extract a feature quantity relating to the processing target image; and the image adjustment amount determination means is desirably constituted to determine at least one adjustment amount of the amplitude and bandwidth of the spatial frequency component relating to the processing target image, on the basis of the feature quantity relating to the neighboring images extracted by the image characteristic extraction means and the feature quantity relating to the processing target image. In this case, at least one adjustment amount of the amplitude and bandwidth of the spatial frequency component relating to the processing target image is determined on the basis of the feature quantity relating to the processing target image in addition to the feature quantity relating to the neighboring images. Therefore, the above adjustment amounts can be determined by considering the visual masking effect that is determined on the basis of the relationship between the feature quantity relating to the neighboring images and the feature quantity relating to the processing target image, for example.

The image adjustment amount determination device according the present invention is desirably constituted further comprising frame variation calculation means for calculating a variation amount which represents the variation between the processing target image and the neighboring images, wherein the image adjustment amount determination means determines at least one adjustment amount of the amplitude and bandwidth of the spatial frequency component relating to the processing target image, on the additional basis of the variation amount calculated by the frame variation calculation means. In this case, the adjustment amount can be determined on the basis of the predetermined variation amount that represents the variation between the processing target image and the neighboring images. For this reason, it is possible to reflect a temporal masking effect which induces a drop in the performance of a person's eyesight due to the discontinuity of the luminance value induced by the variation between the processing target image and neighboring images can be acknowledged and, therefore, the adjustment amount can be determined by considering a larger visual masking effect.

In addition, in the image adjustment amount determination device according to the present invention, the image characteristic extraction means is desirably constituted to extract at least one of the average luminance and the amplitude of the spatial frequency component, as the feature quantity. In this case, because at least one of the average luminance and the amplitude of the spatial frequency component which have a large influence on the visual characteristic and the masking phenomenon can be extracted as the feature quantity of the image, the adjustment amount can be determined through adequate consideration of the visual masking effect.

Furthermore, in the image adjustment amount determination device according to the present invention, the frame variation calculation means is desirably constituted to calculate the motion amount between the processing target image and the neighboring images, as the variation amount. The correlation according to which the larger the motion becomes, the larger the masking effect occurs is reported by the motion sharpening phenomenon. Hence, this correlation is acknowledged by calculating the motion amount between the processing target image and the neighboring images, and the adjustment amount can be determined through adequate consideration of the visual masking effect.

In addition, in the image adjustment amount determination device according to the present invention, the processing target image determination means is desirably constituted to determine, as the neighboring images, one or both of an image which is located before the processing target image in the display order and an image which is located after the processing target image in the display order. Here, the adjustment amount that considers the visual masking effect of the Forward Masking Phenomenon with respect to the processing target image can be determined from a neighboring image by determining the image which is located before the processing target image in the display order as the neighboring image. Likewise, the adjustment amount that considers the visual masking effect of the Backward Masking Phenomenon with respect to the processing target image can be determined from a neighboring image by determining the image which is located after the processing target image in the display order as the neighboring image. Moreover, the adjustment amount that considers both the Forward masking and Backward masking effects received can be determined by selecting, as the neighboring images, both the image which is located before the processing target image in the display order and the image which is located after the processing target image in the display order.

Further, in the image adjustment amount determination device according to the present invention, the image adjustment amount determination means is desirably constituted to determine at least one adjustment amount of the amplitude and bandwidth of the spatial frequency component relating to the processing target image, on the additional basis of the temporal intervals between the processing target image and the neighboring images. The motion sharpening phenomenon has the characteristic that the mask amount of the masking effect grows stronger the closer the images are with respect to time and the mask amount decreases as time elapses. Because there is a correlation between the masking effect and elapsed time, the adjustment amount can be suitably determined by considering the influence of the temporal interval between the processing target image and the neighboring images.

In addition, in the image adjustment amount determination device according to the present invention, the image adjustment amount determination means is desirably constituted to determine the adjustment amount to satisfy a criterion that is predetermined so that the definition perceived for a video signal that includes a post-adjustment processing target image is kept within the same predetermined range with respect to the definition that is perceived for a pre-adjustment video signal. In this case, according to the motion sharpening phenomenon, the adjustment amount can be determined by considering a criterion whereby the definition is kept within the same predetermined range (a criterion whereby the subjective quality is preserved). A criterion according to which the MOS value that is utilized in a subjective evaluation experiment or the like exceeds a fixed value, for example, can be adopted as the criterion.

In addition, in the image adjustment amount determination device according to the present invention, the image adjustment amount determination means is desirably constituted to determine the adjustment amount represented by a combination of characteristics of two or more different types, as the adjustment amount. In this case, for example, with regard to the shape of the spatial frequency component of the adjustment amount for the processing target image, in cases where the visual time-space frequency characteristic is constituted by parts that have characteristics of two different types known as 'transient' and 'sustained', the masking effect relating to the motion sharpening phenomenon can be represented by the presence of these two types of characteristics and, by determining the shape of the spatial frequency component of the adjustment amount, an adjustment amount which can also be explained from a visual standpoint for the motion sharpening phenomenon which maintains the subjective quality can be determined.

The image processing device according to the present invention comprises the image adjustment amount determination device; and image adjustment means for adjusting at least one of the amplitude and bandwidth of the spatial frequency component relating to the processing target image, on the basis of the adjustment amount determined by the image adjustment amount determination device. With such an image processing device, at least one of the amplitude and bandwidth of the spatial frequency component relating to the processing target image can be adjusted on the basis of the adjustment amount determined by the image adjustment amount determination device.

Further, the invention relating to the image adjustment amount device can be grasped as the invention relating to the image adjustment amount determination method and the invention relating to the image adjustment amount determination program. And the invention relating to the image adjustment amount determination method and the invention relating to the image adjustment amount determination program can be described as below. The invention relating to the image adjustment amount determination method and the invention relating to the image adjustment amount determination program exhibit the same effects as those of the invention relating to the image adjustment amount device.

The image adjustment amount determination method according to the present invention comprises a processing target image determination step in which an image adjustment amount determination device receives an input video signal which comprises a plurality of frame images and which is input from the outside, divides the input video signal into the plurality of frame images, and determines a processing target image which is to be the target of image processing and one or more neighboring images which are located in the vicinity of the processing target image in the display order on the basis of a predetermined criterion from the plurality of frame images; an image characteristic extraction step in which the image adjustment amount determination device extracts a feature quantity relating to the neighboring images determined in the processing target image determination step; and an image adjustment amount determination step in which the image adjustment amount determination device determines at least one adjustment amount of the amplitude and bandwidth of a spatial frequency component relating to the processing target image determined in the processing target image determination step, on the basis of the feature quantity that relates to the neighboring images extracted in the image characteristic extraction step.

The image adjustment amount determination program according to the present invention is an image adjustment amount determination program for allowing a computer to function as: processing target image determination means for receiving an input video signal which comprises a plurality of frame images and which is input from the outside, for dividing the input video signal into the plurality of frame images, and for determining a processing target image which is to be the target of image processing and one or more neighboring images which are located in the vicinity of the processing target image in the display order, on the basis of a predetermined criterion from the plurality of frame images; image characteristic extraction means for extracting a feature quantity relating to the neighboring images determined by the processing target image determination means; and image adjustment amount determination means for determining at least one adjustment amount of the amplitude and bandwidth of a spatial frequency component relating to the processing target image determined by the processing target image determination means, on the basis of the feature quantity that relates to the neighboring images extracted by the image characteristic extraction means.

The present invention makes it possible to suitably determine adjustment amounts relating to a processing target image which is contained in a video in order to maintain the subjective quality of the video, on the basis of a feature quantity of frame images which differ from the processing target image.

DESCRIPTION OF THE PREFERRED EMBODIMENTS

Figure 1:
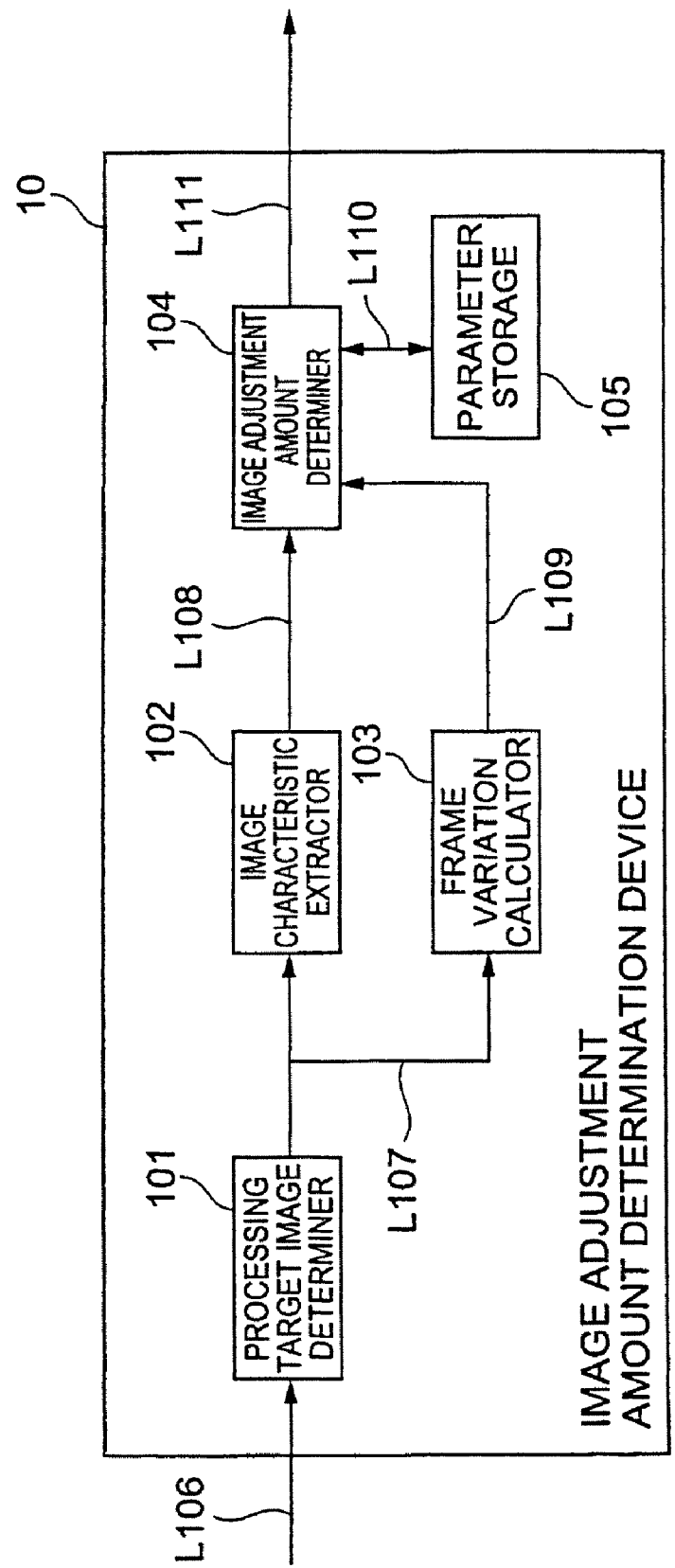
FIG. 1 is a block constitutional view illustrating the constitution of the functions of an image processing device of a first embodiment.

Various embodiments of the present invention will be described hereinbelow on the basis of the drawings. In the drawings, the same criterion numerals have been assigned to the same constituent elements to avoid repetitive description.

First Embodiment

A first embodiment of the present invention will be described first. FIG. 1 is a block constitutional view illustrating the constitution of the functions of an image adjustment amount determination device 10 of the first embodiment. This image adjustment amount determination device 10 is constituted, as hardware, by a computer that comprises a CPU (central processing unit), a storage device such as a memory, and an I/O device (communication device) for inputting and outputting video, and so forth. The image adjustment amount determination device 10 can be constituted by various information processing devices, for example, a mount-type communication terminal such as a personal computer or a mobile communication terminal such as a cellular phone.

[Function Block Constitution of Image Adjustment Amount Determination Device 10]

The function block constitution of the image adjustment amount determination device 10 will be described next with reference to FIG. 1. As shown in FIG. 1, the image adjustment amount determination device 10 is constituted comprising processing target image determiner 101, image characteristic extractor 102, frame image variation calculator 103, image adjustment amount determiner 104, and parameter storage 105.

(Processing Target Image Determiner 101)

Among the aforementioned parts, the processing target image determiner 101 receives an input video signal 106 which is input from the outside as a moving image signal, divides the input video signal 106 into frame images by analyzing the frame rate f, and determines the processing target image F1 which is to be the target of the image processing on the basis of a predetermined criterion K. Here, as a criterion K, for example, a criterion for which the frame number ('display order number' hereinbelow), which indicates the display order when the frame images are placed side by side in the display order is an even number is adopted.

The criterion K is not limited to the one taken above. For example, a criterion which is obtained as a result of the display order number being divided by a predetermined numerical value M or a criterion which is obtained as a result of the display order number not being divided by the predetermined numerical value M may be adopted. Further, a numerical value other than the display order, such as the average luminance, the bandwidth, or the size of the spatial frequency component of the image, for example, may also be employed as criterion K. A criterion at which the average luminance, the bandwidth, and the size of the spatial frequency component of the image are each greater than a predetermined criterion value may also be adopted. The criterion K may also be pre-stored by the processing target image determiner 101 or may be input from the outside to the processing target image determiner 101.

In addition, after determining the processing target frame image F1, the processing target image determiner 101 determines the frame image F0 which is the image that precedes just before the processing target frame image F1 in the display order and the frame image F2 which is the image that follows just after the processing target frame image F1. Thereafter, the frame images thus divided are sent via L107 to the image characteristic extractor 102 and frame image variation calculator 103.

Although an example in which the frame image F0 that precedes just before the processing target frame image F1 and the frame image F2 which is the image that follows just after the processing target frame image F1 are determined in addition to the processing target frame image F1 was illustrated above, the present invention is not limited to such an example. Any frame images may be determined as long as these frame images precede and follow the processing target image F1 in the display order. It is also possible to determine only an image that precedes the processing target image F1 in the display order or determine only an image that follows the processing target image F1.

Furthermore, in the determination of such frame images F0 and F2, only the display order is determined as a criterion but a criterion other than the display order may also be determined as a criterion. For example, the image feature quantity (described subsequently) may also be taken as a criterion, or the display time may be taken as a criterion. As an example in which the display time is taken as a criterion, frame images that exist 100 milliseconds before or after the processing target frame image F1 may also be determined as frame images F0 and F2.

Furthermore, although images before and after the processing target image F1 (a total of two images) are determined as neighboring images in this embodiment, the number of images determined may be any number as long as this number is equal to or more than one.

(Image Characteristic Extractor 102)

Figure 3:
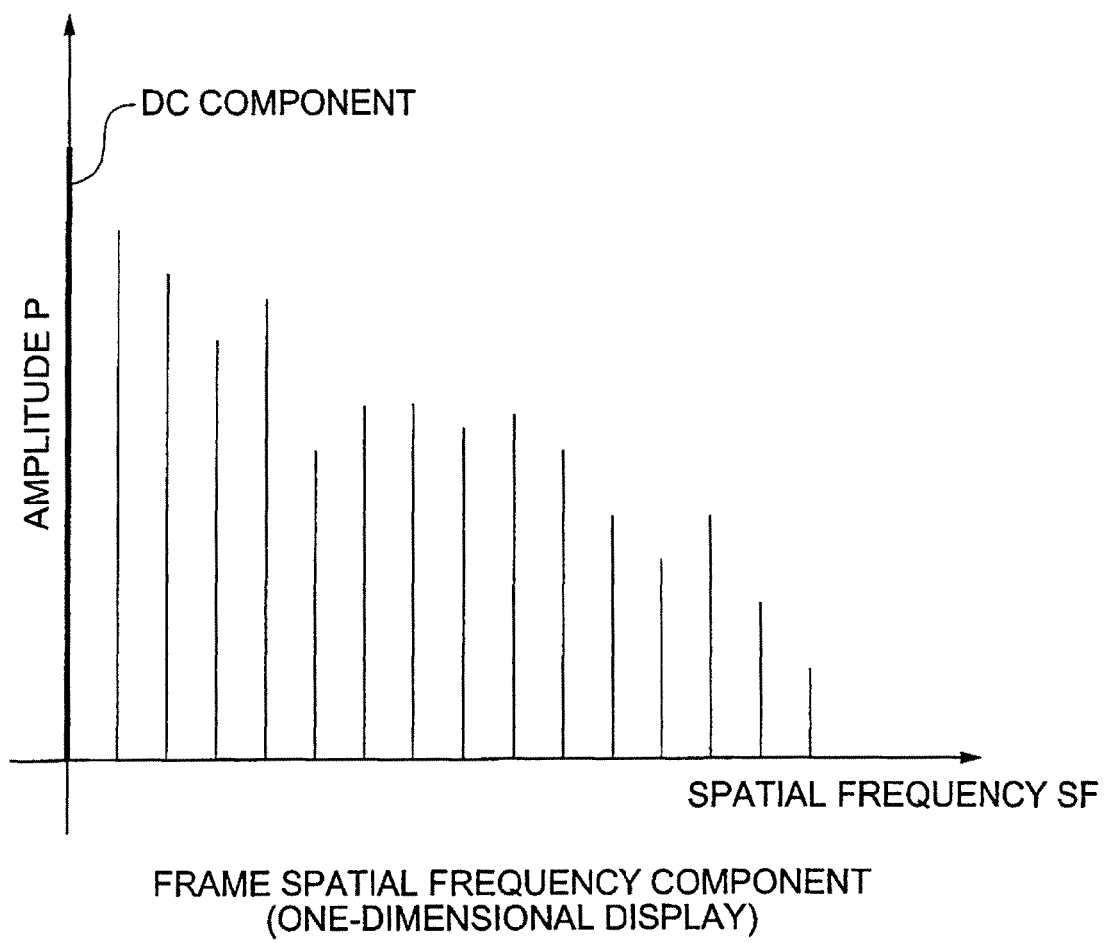
FIG. 3 illustrates the amplitude and DC component of the spatial frequency component in a frequency region.

The image characteristic extractor 102 will be described next. First, the image characteristic extractor 102 calculates the average luminance and the size of the amplitude of the spatial frequency component for the processing target image F1 and the frame images F0 and F2 as follows. More specifically, the image characteristic extractor 102 performs a two-dimensional Fourier Transform on the respective frame images and generates a frequency coefficient matrix, and calculates the amplitude of the coefficient in the frequency coefficient matrix. That is, the image characteristic extractor 102 calculates the square root of the sum of squared real part and squared imaginary part of each Fourier coefficient as the size of the spatial frequency amplitude of each spatial frequency. Further, where the average luminance is concerned, the image characteristic extractor 102 calculates the average luminance by extracting only the DC component of the spatial frequency and performing a reverse transform on the luminance value. The graph in FIG. 3 illustrates the amplitude of the spatial frequency component of the frequency region and the amplitude at spatial frequency=0 indicates the size of the DC component. The representation method relating to the amplitude of the spatial frequency component is not limited to the method outlined above. Other representation methods may also be used. Further, the average luminance may be found by calculating the average value of the luminance values of each frame image. In addition, either the average luminance or the size of the amplitude of the spatial frequency component may be calculated.

In this embodiment, an example in which the average luminance and the amplitude of the spatial frequency component are determined in frame image units is shown. However, the embodiment is not limited thereto and the average luminance and the amplitude of the spatial frequency component may also be determined in block units, for example.

Moreover, although the amplitude of the two-dimensional spatial frequency component is calculated in this embodiment, the amplitude of the spatial frequency component may also be calculated by using a one-dimensional Fourier Transform. In this case, for example, the amplitude of the spatial frequency component may also be calculated by performing a Fourier Transform on each column in a horizontal direction. The amplitude of the spatial frequency component in any one or more of a vertical direction, a horizontal direction, or a predetermined direction other than a vertical or horizontal direction may also be the subject of calculation.

In addition, although the amplitude of the spatial frequency component is utilized as is in this embodiment, the amplitude of the spatial frequency component may also be represented by means of the difference in the size of the spatial frequency component from a certain criterion value. The spatial frequency component may also be represented as the magnitude of the power, for example, and the amplitude of the spatial frequency component may also represented by the difference in the size of the spatial frequency component from a predetermined power criterion value Y[dB] (Y=40).

In addition, although a Fourier Transform is employed for the frequency conversion in this embodiment, a frequency conversion other than a Fourier Transform such as a discrete cosine transform or discrete wavelet transform may also be used.

Moreover, although the size of the amplitude of the average luminance and spatial frequency component is calculated as the 'feature quantity' of the image in this embodiment, another feature quantity may also be calculated. For example, the bandwidth scattering and amplitude scattering of the spatial frequency component may be calculated and the feature quantities (pixel value scatter and image contrast and so forth) using the image luminance may also be calculated.

In addition, although the feature quantities relating to the processing target image F1 and to both the frame images F0 and F2 that exist before and after the processing target image F1 in the display order were calculated in this embodiment, the feature quantities relating to the processing target image F1 is not calculated; only the feature quantities relating to the frame images F0 and F2 that exist before and after the processing target image F1 are calculated and the adjustment amount relating to the processing target image F1 may also be determined on the basis of only the feature quantities relating to the frame images F0 and F2.

Thereafter, the image characteristic extractor 102 transmits the average luminance and size of the amplitude of the spatial frequency component calculated as outline above to the image adjustment amount determiner 104.

(Frame Image Variation Calculator 103)

Figure 2:
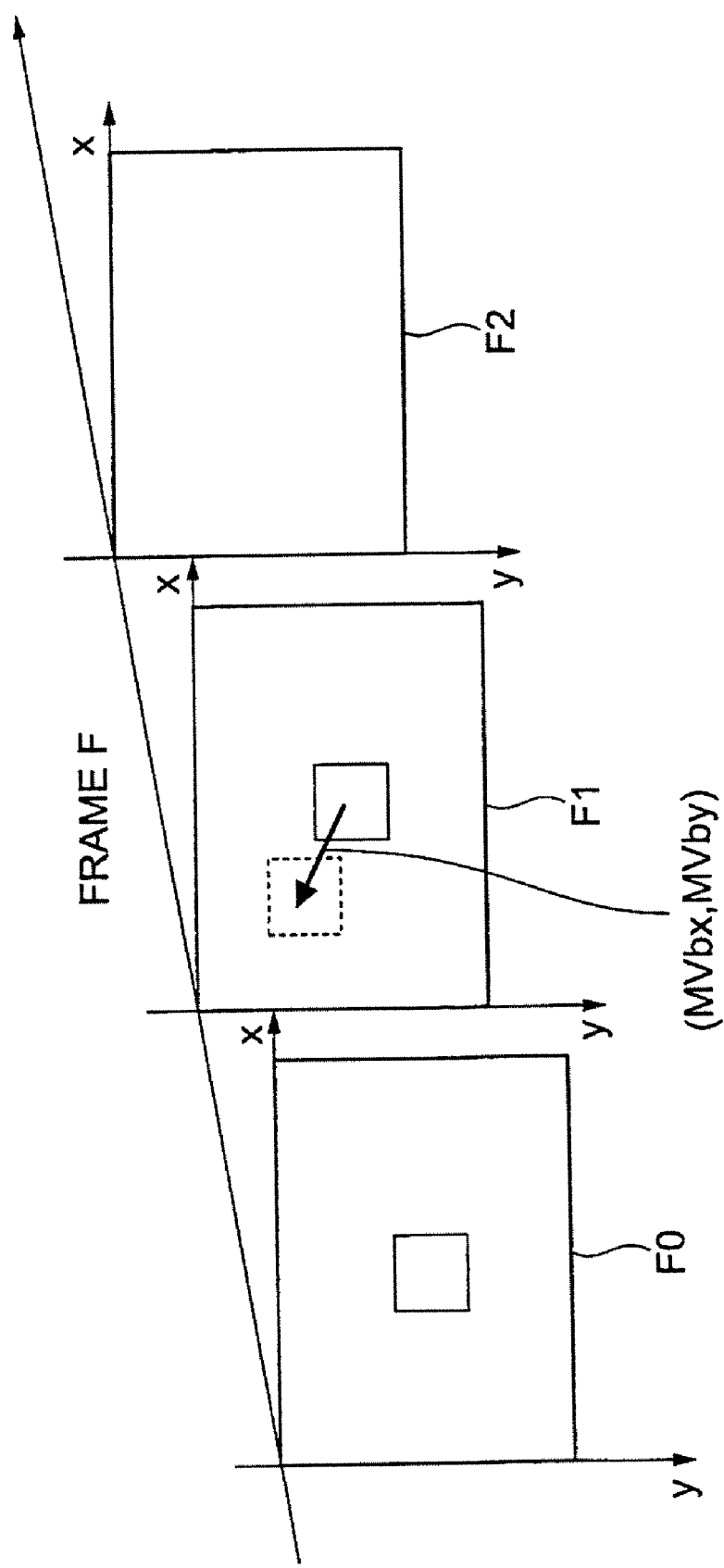
FIG. 2 is a conceptual view of frame images which are read.

The frame image variation calculator 103 will be described next. FIG. 2 is a conceptual view of a video comprising a plurality of frame images. For the sake of convenience in the description, the description will employ a total of three consecutive frame images which are the processing target image F1 and the images F0 and F2 shown in FIG. 2. The frame image variation calculator 103 calculates the amount of motion between the images F0 to F2 as follows. The details of the processing to calculate the motion amount will be described in detail hereinbelow.

First, the frame image variation calculator 103 sequentially reads two consecutive frame images. The frame image variation calculator 103 calculates motion vectors (MVbx, MVby) that is the spatial displacement magnitude between the two frame images on the basis of image signal patterns (so-called 'mutually analogous image signal patterns') whose degree of coincidence is equal to or more than a predetermined value, between two frame images which are read.

In this embodiment, the frame image variation calculator 103 divides the frame images into a plurality of blocks of a predetermined size and uses search processing such as block matching to retrieve, from image F0, image signal patterns which are most similar to the image signal patterns of the respective blocks (image signal patterns for which the degree of coincidence is equal to or more than a predetermined value, for example), for each block of image F1. Further, the frame image variation calculator 103 calculates a motion vector by judging a displacement amount, which indicates to what extent a position in the frame image is displaced, in blocks with a common image signal pattern, between the images F0 and F1.

Thereafter, the frame image variation calculator 103 calculates the motion amount V1 (MVx1, MVy1) of the whole frame image by calculating the median value of the motion vectors of the respective blocks on the basis of the motion vectors (MXbx, MVby) calculated for all the blocks. Further, the motion amount V2 (MVx2, MVy2) are also calculated by means of the same procedure for the motion vectors between the images F2 and F1.

The median value of the motion vectors which are calculated for all the blocks is calculated in this embodiment. However, instead of using the median value of the motion vectors for all the blocks, any of the average value, maximum value, intermediate value, and minimum value of the size of the motion vectors (MVx, MVy) calculated for each block contained in the frame image, for example, may be used. Furthermore, the motion vector of each block may also be utilized.

In addition, block matching is employed in the calculation of the motion amounts in this embodiment but the calculation method used is not limited to block matching. The motion vectors may also be calculated by using another calculation method such as optical flow or the like, for example.

Furthermore, although the motion amount is calculated utilizing the motion vectors in this embodiment, the amount of variation between frame images may also be calculated on the basis of another feature quantity which focuses on image motion such as, for example, the direction of the motion, the distribution of the motion vectors of the blocks in the frame images, the difference in the size of the respective motion vectors, the difference in the direction of the respective motion vectors, and the proportion of motion vectors whose size is equal to or more than a prescribed value.

In addition, although the motion amount is calculated as the variation between frame images in this embodiment, a variation between frame images which pays attention to the variation in pixel values (such as the pixel value variation amount or the average luminance variation, and so forth, for example) may otherwise be calculated.

In addition, the motion amount may be calculated by using the phase during frequency conversion of the image. In this case, the Discrete Fourier Transform or the like is implemented with respect to all the pixels of two images, a conversion from pixel space to frequency space is performed, and the same frequency components of the respective images are divided, whereby a motion vector that uses the size of the phase may be calculated. After the phases of the respective frequency components are calculated, the values of all the phases are totaled and the total value is made the motion amount. Furthermore, usage is not limited to the phases following frequency conversion and any value may be calculated as long as this value represents the motion amount between two images.

In addition, although the motion amount is calculated by using the frame image which precedes just before the processing target image F1 and the frame image which follows just after the processing target image F1 in this embodiment, the calculation method is not limited to such a method. For example, in cases where a different frame image exists between the processing target image F1 and the neighboring frame image F0, the motion vectors may be calculated by also utilizing this other frame image.

Furthermore, although motion vectors are calculated by utilizing the processing target image F1 and images F0 and F2 in this embodiment, motion vectors may also be calculated after carrying out filter processing on the processing target image F1 and the images F0 and F2. By using an edge emphasis filter or the like, for example, motion vectors that focus on the edge exhibiting the greatest variation with respect to blurring can be calculated. In addition, motion vectors can be calculated between images for which the effect of noise is small by using a lowpass filter or the like.

Thereafter, the frame image variation calculator 103 transmits the calculated motion amount V1 (MVx1, MVy1) between images F0 and F1 and the motion amount V2 (MVx2, MVy2) between F1 and F2 to the image adjustment amount determiner 104.

(Parameter Storage 105)

The parameter storage 105 pre-stores parameters which satisfy a criterion V (the MOS value is equal to or more than 4.0, for example) with which subjective quality is preserved when a person collectively views video with the respective characteristics (frame images F0 to F2).

However, the parameter storage 105 may also store the parameter group based on a criterion other than the above criterion V such as a criterion V which is based on an objective index such as PSNR, for example.

(Image Adjustment Amount Determiner 104)

The image adjustment amount determiner 104 will be described next. The image adjustment amount determiner 104 has the average luminance and the size of the spatial frequency component of the frame images F0 to F2 input thereto via L108 and the motion amount between the frame images F0 and F1 and the motion amount between the frame images F1 and F2 input thereto via L109. The image adjustment amount determiner 104 determines the adjustment amount with which the amplitude and bandwidth of the spatial frequency component for the processing target image F1 are restricted as mentioned hereinbelow on the basis of the average luminance and the size of the amplitude of the spatial frequency component which are transmitted thereto as well as the size of the motion vectors. The bandwidth described in this embodiment is a bandwidth of a row of pixels with a maximum frequency component of a size which is equal or less than y % of the DC component among the coefficients in a row of frequency coefficients. For example, although y=0.5 in this embodiment, other numerical values may also be used. In addition, in this embodiment, the adjustment amounts with respect to the respective spatial frequency components in the horizontal and vertical directions are determined as follows.

First, the image adjustment amount determiner 104 compares the size P_sf (F0) of the amplitude of the respective spatial frequency SF components of image F0 and the size P_sf (F1) of the component of the spatial frequency sf corresponding with image F1 in the horizontal direction. Further, after performing this comparison for all the spatial frequency components, in cases where the number of P_sf (F0) greater than P_sf (F1) exceeds X % of all the spatial frequency components (here, X is set such that X=50%), the image adjustment amount determiner 104 calls the parameters A to G in Equation (1) below from the parameter storage 105 on the basis of the (1) the average luminance Yave (F0) of the images F0, (2) the respective spatial frequency SF, (3) the size P_sf (F0) of the amplitude of the respective components of spatial frequency SF, (4) the value of MVx1 of the motion amount V1 (MVx1, MVy1) between F0 to F1, and (5) the temporal interval t (corresponds to (the number of frame images N/frame rate f)) of the frame images determined by the frame image coefficient N between the two frame images and the frame rate f calculated by means of the processing target image determiner 101, and determines the adjustment amount R1x from the called parameters A to G and Equation (1).

$$\text{Adjustment amount } (Yave, SF, P_{sf}, mv, t) = \tag{1}$$
$$\frac{A}{1 + (\alpha \times SF/\beta)^{2n}} + B \times \exp(-((SF - \gamma 1)/C)^2) +$$
$$D \times \exp(-((SF - \gamma 2)/E)^2) + F \times \exp(-((SF - \gamma 3)/G)^2)$$

However, in cases where the number of P_sf(F0) greater than P_sf(F1) does not exceed X % of all the spatial frequency components, a different parameter group from A to G is called from the parameter storage 105 and the adjustment amount R1x is determined by means of the called parameters A to G and Equation (1).

Thereafter, the image adjustment amount determiner 104 uses the same procedure as that mentioned above to calculate the adjustment amount R1y for the spatial frequency components in the vertical direction. Thereupon, the spatial frequency component in the vertical direction is utilized as the size P_sf of the amplitude of the respective components of spatial frequency SF and the value of the MVy1 of the motion amount V1 (MVx1, MVy1) between F0 and F1 is utilized as the motion amount.

Further, the adjustment amount (Yave, SF, $P_{sf}$, mv, t) in Equation (1) signifies the amplitude characteristic of the adjustment amount of a one-dimensional spatial frequency component and the respective coefficients n, α, β, γ1, γ2, and γ3 are constants.

Likewise, the image adjustment amount determiner 104 first compares the size P_sf (F2) of the amplitude of the respective spatial frequency SF components of image F2 and the size P_sf (F1) of the component of the corresponding spatial frequency SF of image F1 in the horizontal direction. Further, after this comparison has been made for all of the spatial frequency components, in cases where the number of P_sf(F2) greater than P_sf(F1) exceeds X % of all the spatial frequency components (here X is set as X=50%), the image adjustment amount determiner 104 calls the parameters A to G in Equation (1) from the parameter storage 105 on the basis of (1) the average luminance Yave (F2) of image F2, (2) the respective spatial frequency SF, (3) the size P_sf (F2) of the amplitude of the respective components of spatial frequency SF, (4) the value of MVx2 of the motion vector V2 (MVx2, MVy2) between F1 and F2, and (5) the temporal interval t ((corresponds to the number of frame images N/frame rate f)) of the frame images determined by means of the number of frame images N between the two frame images and the frame rate f calculated by means of the processing target image determiner 101, and determines the adjustment amount R2x by means of the called parameters A to G and Equation (1).

However, in cases where the number of P_sf (F2) greater than P_sf (F1) does not exceed X % of all the spatial frequency components, a parameter group different from A to G above is called from the parameter storage 105 and the adjustment amount 2x is determined by means of the called parameters A to G and Equation (1).

Thereafter, the image adjustment amount determiner 104 uses the same procedure as that mentioned above to calculate the adjustment amount R2y for the spatial frequency components in the vertical direction. Thereupon, the spatial frequency component in the vertical direction is utilized as the size P_sf of the amplitude of the respective components of spatial frequency SF and the value of the MVy2 of the motion amount V2 (MVx2, MVy2) between F1 and F2 is utilized as the motion amount.

The adjustment amount R3x and the adjustment amount R3y are calculated by totaling the adjustment amounts in the same directions from the adjustment amount R1x and adjustment amount R1y calculated on the basis of the parameters determined from the feature quantity between images F0 and F1 and from the adjustment amount R2x and adjustment amount R2y calculated on the basis of the parameters determined from the feature quantity between images F1 and F2, which are determined as detailed earlier. That is, R3x=R1x+R2x, R3y=R1y+R2y.

Thereafter, the image adjustment amount determiner 104 outputs the calculated adjustment amount R3x and adjustment amount R3y via L111.

In this embodiment, the adjustment amount R1i and adjustment amount R2i (i indicates x or y) are calculated separately and adjustment amount R3i is calculated using the adjustment amount R1i and adjustment amount R2i but the parameters for adjustment amount R3i may also be determined directly from the feature quantities of the frame images F0 to F2.

In addition, although the adjustment amounts are calculated separately in the horizontal direction and vertical direction in this embodiment, a calculation of a two-dimensional adjustment amount may also be performed.

Furthermore, although the parameters are selected by performing a comparison of the size of the amplitude for all the spatial frequency components between the frame images in this embodiment, parameters may also be selected by making a comparison for only some of the spatial frequency components or parameters may be selected without making such a comparison. Additionally, although proportion X in the comparison is set at '50', the proportion X is not limited to '50'. Furthermore, a selection of parameters may also be made for each of the spatial frequencies on the basis of the size of the amplitudes of all the spatial frequency components.

In this embodiment, although parameters A to G are determined on the basis of (1) the average luminance Yave of the frame image F0 or F2, (2) the respective spatial frequency SF, (3) the size P_sf of the amplitudes of the respective components of spatial frequency SF of the frame image F0 or F2, (4) the motion vectors V (MVx, MVy) between frame images, and (5) the temporal interval t between the frame images, the parameters may also be determined by using at least one feature quantity among (1) to (5). In addition, the parameters may be determined by using the relative relationship of frame image F0 or F2 with respect to (1) and (3). Furthermore, in addition to video feature quantities, the parameters may be determined by also utilizing information relating to the environment in which the video is viewed. For example, the parameters may also be determined by inputting information such as the display performance of the display (resolution or the like), the viewing distance, or the size of the video from the outside and using the values of these items.

Furthermore, although a comparison of the amplitudes of the spatial frequency components of the processing target image F1 and image F0 and a comparison of the amplitudes of the spatial frequency components of the processing target image F1 and image F2 are carried out as comparisons in this embodiment, comparisons are not limited to such comparisons and a comparison of the average luminance may also be made.

In addition, although, other than the motion amount V (MVx, MVy), a feature quantity relating to the variation between the frame images is not employed in this embodiment, the parameters may also be determined by utilizing an average luminance variation amount or a spatial frequency component variation amount, or the like, as feature quantities, for example. In addition, motion amounts may be calculated by using feature quantities such as the direction of motion, the distribution of motion vectors in the frame image, the difference in size of the respective motion vectors, the difference in the direction of the respective motion vectors, and the proportion of the motion vectors of a size equal to or more than the prescribed value.

The constitution may also be such that one lowpass filter and three bandpass filters are combined so that Equation (1) above, which represents the amplitude characteristic of the amplitude and bandwidth restriction amounts of the spatial frequency components of this embodiment, trials a qualitative model for the masking phenomenon with the first term on the right side $$\frac{A}{1+(\alpha \times SF/\beta)^{2n}}$$

representing the 'transient' channel of human vision, and the second term to the fourth term on the right side $$B \times \exp(-((SF-\gamma 1)/C)^2) + D \times \exp(-((SF-\gamma 2)/E)^2) + F \times \exp(-((SF-\gamma 3)/G)^2)$$

representing the 'sustained' channel (that is, to represent two different characteristics). Accordingly, this is also easy to illustrate from a visual standpoint. However, the method of representing the restriction amounts for the amplitude and bandwidth of the spatial frequency component is not limited thereto and may also be represented by a combination of three or more different characteristics, for example. Furthermore, the type and number of filters are not restricted in a case where filters are used in the representation of the restriction amounts. Moreover, more general filters such as, for example, lowpass filters, bypass filters, bandpass filters, or band reject filters, for example, or a combination thereof may also be used. In addition, although the respective coefficients n, $\alpha$, $\beta$, $\gamma 1$, $\gamma 2$, and $\gamma 3$ in Equation (1) are assumed to be constants, these values may also be set as parameters determined by the feature quantities of the respective frame images.

In addition, although the adjustment amount R3i is obtained b calculating the total value of the adjustment amount 1i and the adjustment amount R2i in this embodiment, of the adjustment amount 1i and adjustment amount R2i, the adjustment amount with the greater (or smaller) adjustment amount bandwidth restriction for the spatial frequency component may be taken as the adjustment amount R3i. In addition, the average value, maximum value, minimum value, or center value of the adjustment amount R1i and adjustment amount R2i may also be employed as the adjustment amount R3i.

In addition, a different criterion may also be used such as, for example, a criterion relating to the good quality of the amplitude characteristic such as the fact that the passband characteristic is better than a predetermined criterion or that the attenuation band characteristic is better than a predetermined criterion. Further, in cases where two or more frame images are selected, the judgments may be made using the same criterion.

Furthermore, although the adjustment amounts of adjustment amount 1i and adjustment amount R2i are determined by using the same Equation (1) in this embodiment, the adjustment amounts may also be determined by means of mutually different equations. For example, different equations that represent a different quality of masking effect in a preceding or subsequent position in the display order may also be employed, for example.

In addition, although the adjustment amounts of this embodiment represent adjustment amounts relating to both the amplitude and bandwidth of the spatial frequency component, the adjustment amount relating to either one of the amplitude and bandwidth of the spatial frequency component may also be illustrated.

In addition, although amounts serving to restrict the amplitude and bandwidth of the spatial frequency component are illustrated as adjustment amounts in this embodiment, amounts which serve to extend the amplitude and bandwidth of the spatial frequency component may also be used.

[Image Process by the Image Adjustment Amount Determination Device 10]

Figure 4:
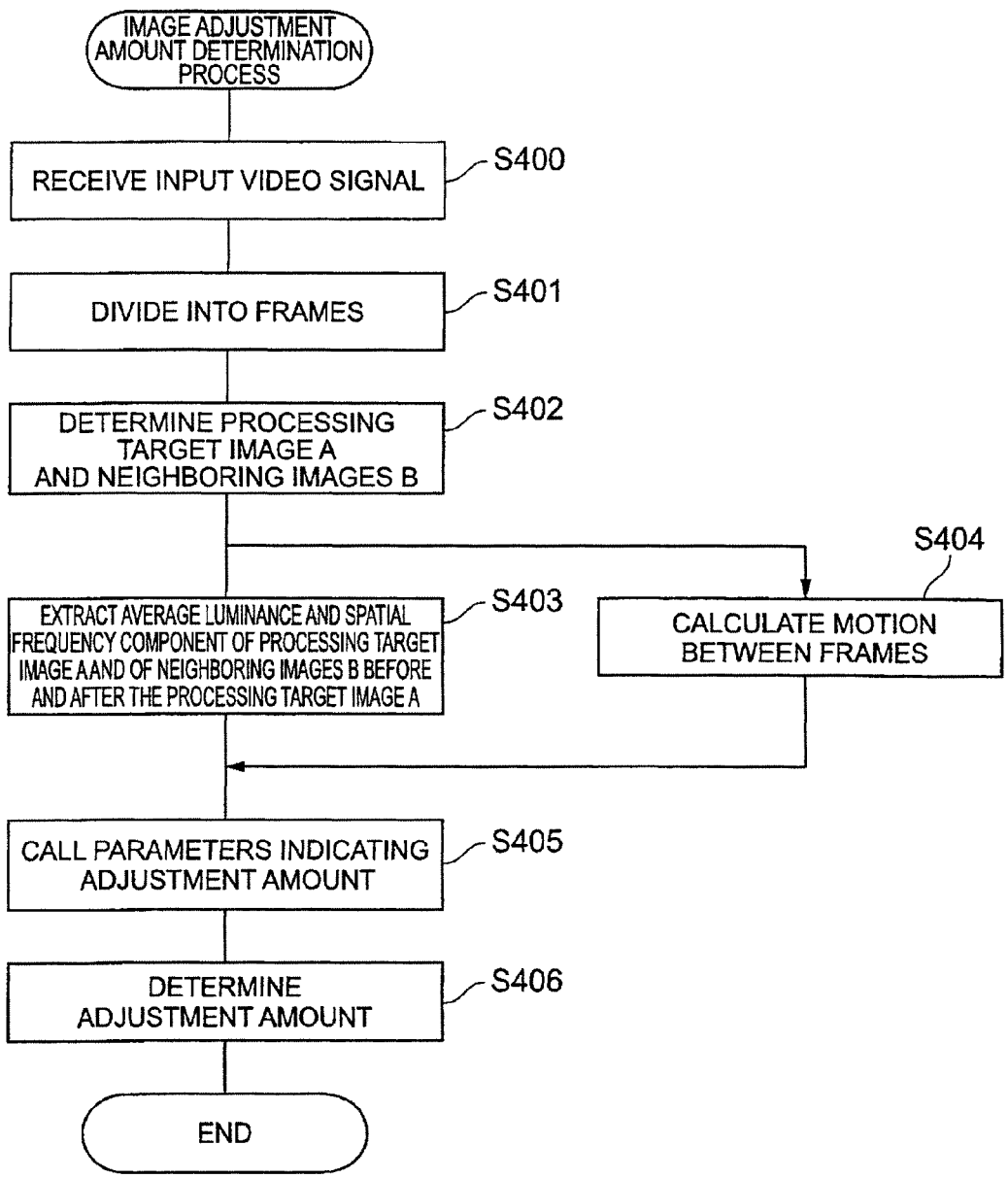
FIG. 4 is a flowchart showing the flow of the image process of the first embodiment.

Image processing of the image adjustment amount determination device 10 of the first embodiment will be described next with criterion to FIG. 4. FIG. 4 is a flowchart that shows the image processing of the image adjustment amount determination device 10.

First, the processing target image determiner 101 receives an input video signal 106 that has been transmitted via the L107 (step S400) before dividing the input video signal 106 into frame images by analyzing the frame rate f (step S401) and determining a total of three images which are the processing target image F1 and adjacent frame images F0 and F2 which precede and follow the processing target image respectively in the display order from among the frame images obtained as a result of the signal division (step S402). The frame images F0 to F2 thus determined are sequentially transmitted to the image characteristic extractor 102 and frame image variation calculator 103.

Thereafter, the image characteristic extractor 102 calculates the average luminance of the frame images F0 to F2 and the size of the amplitude of the respective spatial frequency components (step S403). The calculation method used was that mentioned earlier. The calculated average luminance and the size of the amplitude of the spatial frequency components are then sent to the image adjustment amount determiner 104.

At the same time as step S403, the frame image variation calculator 103 calculates, on the basis of images F0 to F2, the motion vectors between the frame images between F0 and F1 and F1 and F2 as motion amounts of the images F0 to F2 and calculates the motion amount of the frame image F1 from the frame image F0 and the motion amount of the frame image F2 from the frame image F1 (step S404). The motion amount calculation method is as mentioned earlier. The motion amounts thus calculated are sent to the image adjustment amount determiner 104.

Thereafter, the image adjustment amount determiner 104 selects parameters which are stored in the parameter storage 105 on the basis of the calculated average luminance, amplitude of the spatial frequency components, spatial frequency, motion amount, and frame image time interval (step S405). Further, the image adjustment amount determiner 104 calculates the total value of the adjustment amount 1 of the amplitude and bandwidth of the spatial frequency components with respect to the processing target image F1 from the frame image F0 and the adjustment amount 2 with respect to the frame image F1 from the frame image F2 which are generated on the basis of the selected parameters and determines the calculated total value as the adjustment amount 3 of the amplitude and bandwidth of the spatial frequency component with respect to the processing target image (step S406). The adjustment amount determination method used is that detailed earlier. Thereafter, adjustment amount 3 thus determined is output and the processing of FIG. 4 is terminated.

[Results of First Embodiment]

As mentioned earlier, with the image adjustment amount determination device 10 of the first embodiment, the processing target frame image in the video is determined and the average luminance of the frame images whose display order precedes and follows that of the processing target frame image respectively as well as the amplitudes of the spatial frequency components and the motion amounts between the frame images are calculated. Further, the adjustment amounts are determined by determining the parameters for constituting the adjustment amounts representing the amplitude and bandwidth of the minimum spatial frequency component required to preserve the predetermined subjective quality (subjective definition, for example) on the basis of the calculated feature quantity. Hence, the adjustment amounts for the amplitude and bandwidth of the spatial frequency that allow the subjective definition to be preserved when the preceding and subsequent frame images are collectively viewed as video can be determined for the processing target image F1 of the input video signal from the feature quantities of the processing target image F1 and of the frame images F0 and F2 which precede and follow the processing target image F1 and an adjustment amount which constitutes an index for the deletion of the information amount for the processing target image F1 can be suitably determined while preserving the video quality.

Second Embodiment

Figure 5:
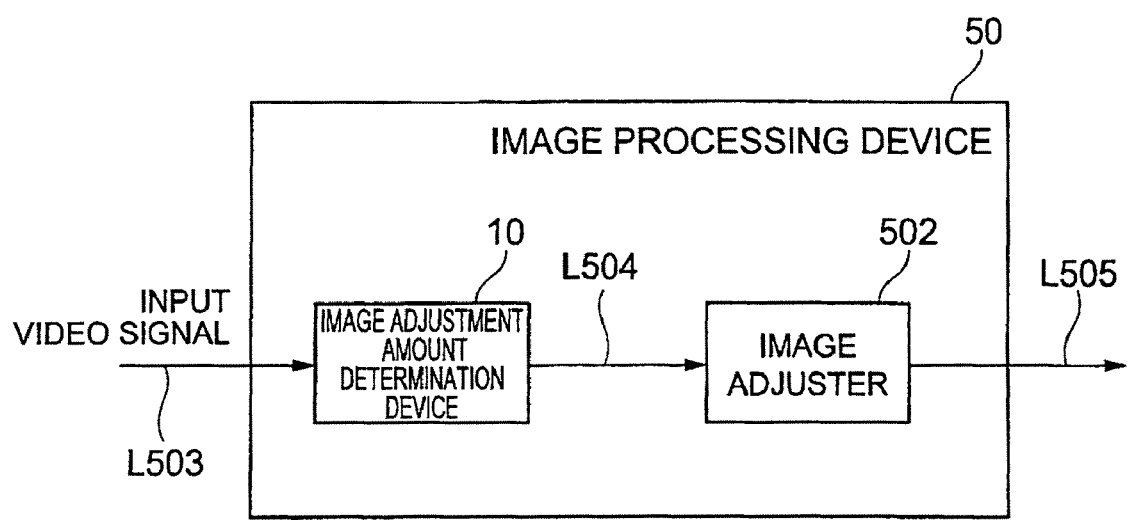
FIG. 5 is a block constitutional view illustrating the constitution of the functions of an image processing device of a second embodiment.

A second embodiment of the present invention will be described next. FIG. 5 is a block constitutional view illustrating the constitution of the functions of an image processing device 50 of the second embodiment. The image processing device 50 is constituted by a computer that comprises, as hardware, a CPU (central processing unit), a device such as a memory, and an I/O device (communication device) for inputting and outputting video, and so forth. The image processing device 50 can be constituted by various information processing devices, for example, a mount-type communication terminal such as a personal computer or a mobile communication terminal such as a cellular phone.

[Function Block Constitution of Image Processing Device 50]

The function block constitution of the image processing device 50 will be described hereinbelow with reference to FIG. 5. As shown in FIG. 5, the image processing device 50 is constituted comprising the image adjustment amount determination device 10 that appears in the first embodiment and image adjuster 502.

Among these parts, the image adjustment amount determination device 10 has the function constitution shown in FIG. 1 as mentioned in the first embodiment and is constituted comprising the processing target image determiner 101, the image characteristic extractor 102, the frame image variation calculator 103, the image adjustment amount determiner 104, and the parameter storage 105. The image adjustment amount determination device 10 divides the input video signal 503 that is input from the outside as a moving image signal into frame images by analyzing the frame rate of the input video signal 503 and determines a total of three images which are the processing target image F1 and adjacent frame images F0 and F2 which precede and follow the processing target image respectively in the display order from among the frame images obtained as a result of the signal division. The image adjustment amount determination device 10 then calculates the average luminance of the frame images F0 to F2 and the amplitude of the spatial frequency component and the motion amount between the frame images, determines the adjustment amounts for the size of the amplitude and bandwidth of the spatial frequency component of the processing target image F1 on the basis of the calculated feature quantities and then outputs the adjustment amounts to the image adjuster 502 via L504.

The image adjuster 502 performs adjustment of the amplitude and bandwidth of the spatial frequency component of the image on the basis of the adjustment amount. More specifically, the image adjuster 502 first calculates the spatial frequency component of the processing target image F1 (average luminance and the size of the spatial frequency component). That is, the image adjuster 502 effects a two-dimensional Fourier Transform with respect to the respective frame images and generates a frequency coefficient matrix and calculates the amplitude of the coefficients in the frequency coefficient matrix. That is, the image adjuster 502 calculates the square root of the sum of two times the real number term and two times the imaginary number of each Fourier coefficient as the size of the amplitude of each spatial frequency. Further, the image adjuster 502 calculates the average luminance by extracting only the DC component of the spatial frequency and performing a reverse transform on the DC component of the spatial frequency luminance value to produce a luminance value. The representation method relating to the amplitude of the spatial frequency component is not limited to the method outlined above. Other representation methods may also be used. Further, the average luminance may be found by calculating the average value of the luminance values of the respective frame images and determining the average value as the average luminance.

Although the same method as that for the image adjustment amount device 10 of the first embodiment is utilized to calculate the amplitude of the spatial frequency component in the second embodiment, the amplitude of the spatial frequency component may also be calculated by means of a different procedure.

Thereafter, the image adjuster 502 performs amplitude and bandwidth adjustment of the spare frequency component by multiplying the calculated spatial frequency component of the processing target image F1 by the adjustment amount in the frequency region. Further, the image adjuster 502 performs a reverse two-dimensional Fourier Transform on the adjusted spatial frequency component to implement conversion to pixel values and outputs the pixel values.

Although the processing target image is converted into a frequency region and adjustment of the amplitude and bandwidth of the spatial frequency component in the frequency region is performed in this embodiment, processing may also be performed in a pixel space. For example, a method that performs filter processing on the pixel values may also be adopted. In addition, although processing in frame image units is illustrated in this embodiment, there are no particular restrictions on the processing units. Processing may also be carried out in block units, for example.

In addition, although an adjustment method that multiplies the spatial frequency component of the processing target image F1 by the adjustment amount is illustrated in this embodiment, this embodiment is not limited to this adjustment method. For example, processing to restrict the spatial frequency component to the bandwidth indicated by the adjustment amount may also be performed without changing the amplitude of the spatial frequency component.

Further, adjustment of the amplitude and bandwidth of the spatial frequency component may also be carried out by deleting the value of a spatial frequency component at a low power level by performing quantization and reverse quantization in which a certain quantization criterion is fixed with respect to the frequency component. In addition, otherwise, any procedure may be used as long as the means adjusts the amplitude and bandwidth of the spatial frequency component.

[Image Process by the Image Processing Device 50]

Figure 6:
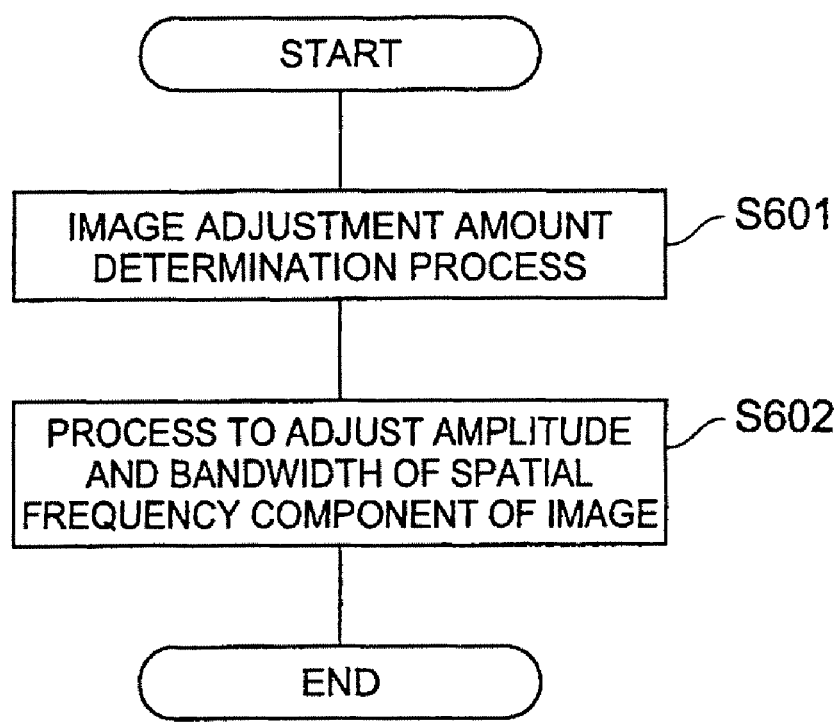
FIG. 6 is a flowchart showing the flow of the image process of the second embodiment.

The image processing of the image processing device 50 of the second embodiment will be described next on the basis of FIG. 6. FIG. 6 is a flowchart that shows the image processing of the image processing device 50.

First, a target video is input and the input video signal 503 that is input is sent to the image adjustment amount determination device 10. The image adjustment amount determination device 10 uses the input video signal 503 to calculate the adjustment amounts for the amplitude and bandwidth of the spatial frequency component with respect to the processing target image F1. That is, the image adjustment amount determination device 10 determines the adjustment amounts of the spatial frequency component of the processing target image F1 by performing image adjustment amount calculation processing of steps S401 to S406 in FIG. 4 which are described in the first embodiment by using the input video signal 503 (step 601).

Thereafter, the image adjuster 502 performs adjustment of the spatial frequency component of the image on the basis of the adjustment amounts determined by the image adjustment amount determination device 10 (step S602). The specific adjustment method used is that described earlier. Following the adjustment, the image adjuster 502 outputs images for which the amplitude and bandwidth of the spatial frequency component have been adjusted by performing a reverse transform on the spatial frequency component for a conversion to pixels values and the processing of FIG. 6 is terminated.

[Effects of the Second Embodiment]

As mentioned earlier, with the image processing device 50 of the second embodiment, the processing target frame image in the video is determined and the average luminance [of frame images] whose display order precedes and follows the processing target frame image as well as the amplitude of the spatial frequency component and the motion amount between the frame images are calculated. Based on the feature quantities thus calculated, adjustment amounts are determined by determining the parameters for constituting the adjustment amounts representing the amplitude and bandwidth of the minimum spatial frequency component required to preserve the predetermined subjective quality (subjective definition, for example). Thereafter, based on the adjustment amounts thus determined, adjustment of the amplitude and bandwidth of the spatial frequency component of the processing target image F1 is performed. Therefore, the adjustment amounts for the amplitude and bandwidth of the spatial frequency component that allow the subjective definition to be preserved when the preceding and subsequent frame images are collectively viewed as video can be determined for the processing target image F1 of the input video signal from the feature quantities of the processing target image F1 and of the frame images F0 and F2 that precede and follow the processing target image F1 and, by performing adjustment of the spatial frequency component of the image which corresponds to the usage state on the basis of the adjustment amounts thus determined, an adjustment amount which constitutes an index for the deletion of the information amount for the processing target image F1 can be suitably determined while preserving the video quality.

[Image Adjustment Amount Determination Program]

Figure 7:
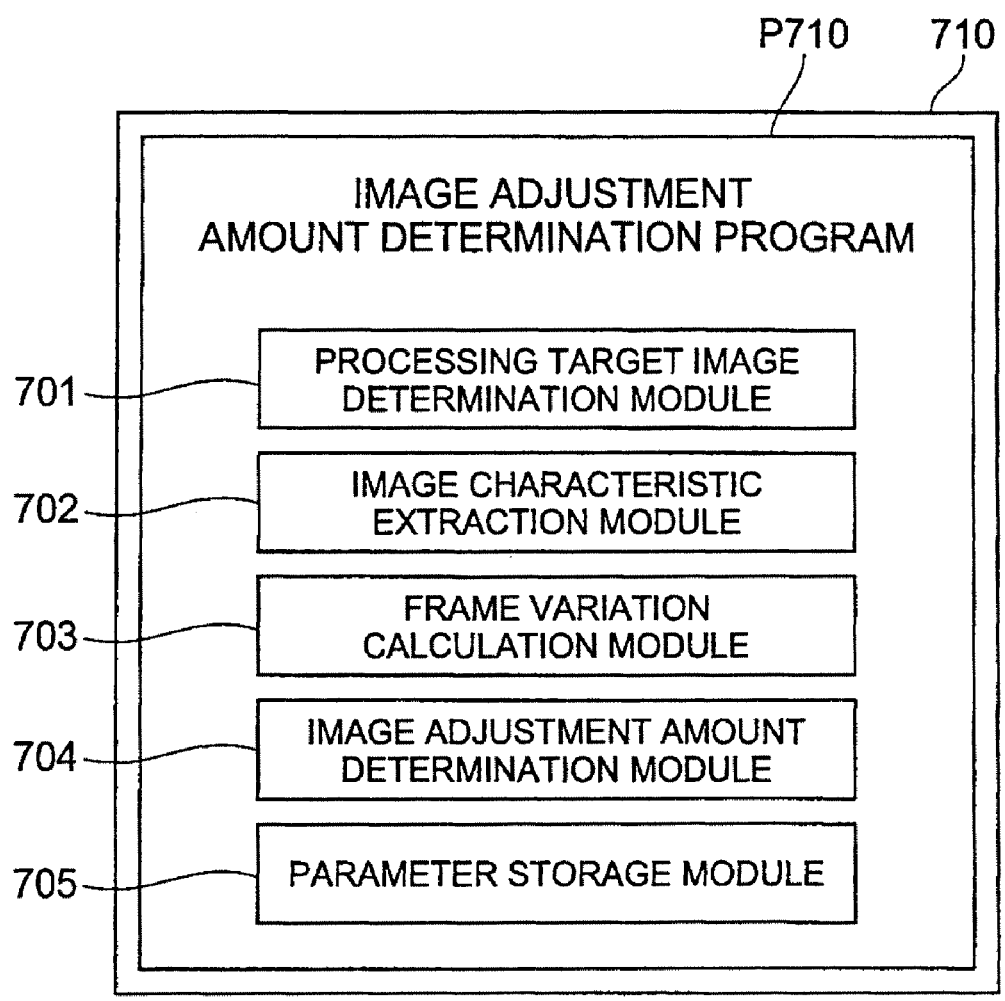
FIG. 7 is a constitutional view of an image adjustment amount determination program.

An image adjustment amount determination program that allows a computer to operate as an image adjustment amount determination device of the present invention will be described next. FIG. 7 shows the constitution of the image adjustment amount determination program P710 in conjunction with the recording medium 710. The recording medium 710 can be constituted by a recording medium such as a flexible disk, a CD-ROM, a DVD, or a ROM or by a semiconductor memory or the like.

As shown in FIG. 7, the image adjustment amount determination program P710 is constituted comprising a processing target image determination module 701, an image characteristic extraction module 702, a frame variation calculation module 703, an image adjustment amount determination module 704, and a parameter storage module 705. The processing target image determination module 701 is a module for implementing the functions of the processing target image determiner 101 in FIG. 1; the image characteristic extraction module 702 is a module for implementing the functions of the image characteristic extractor 102; the frame variation calculation module 703 is a module for implementing the functions of the frame image variation calculator 103; the image adjustment amount determination module 704 is a module for implementing the functions of the image adjustment amount determiner 104; and the parameter storage module 705 is a module for implementing the functions of the parameter storage 105.

Figure 8:
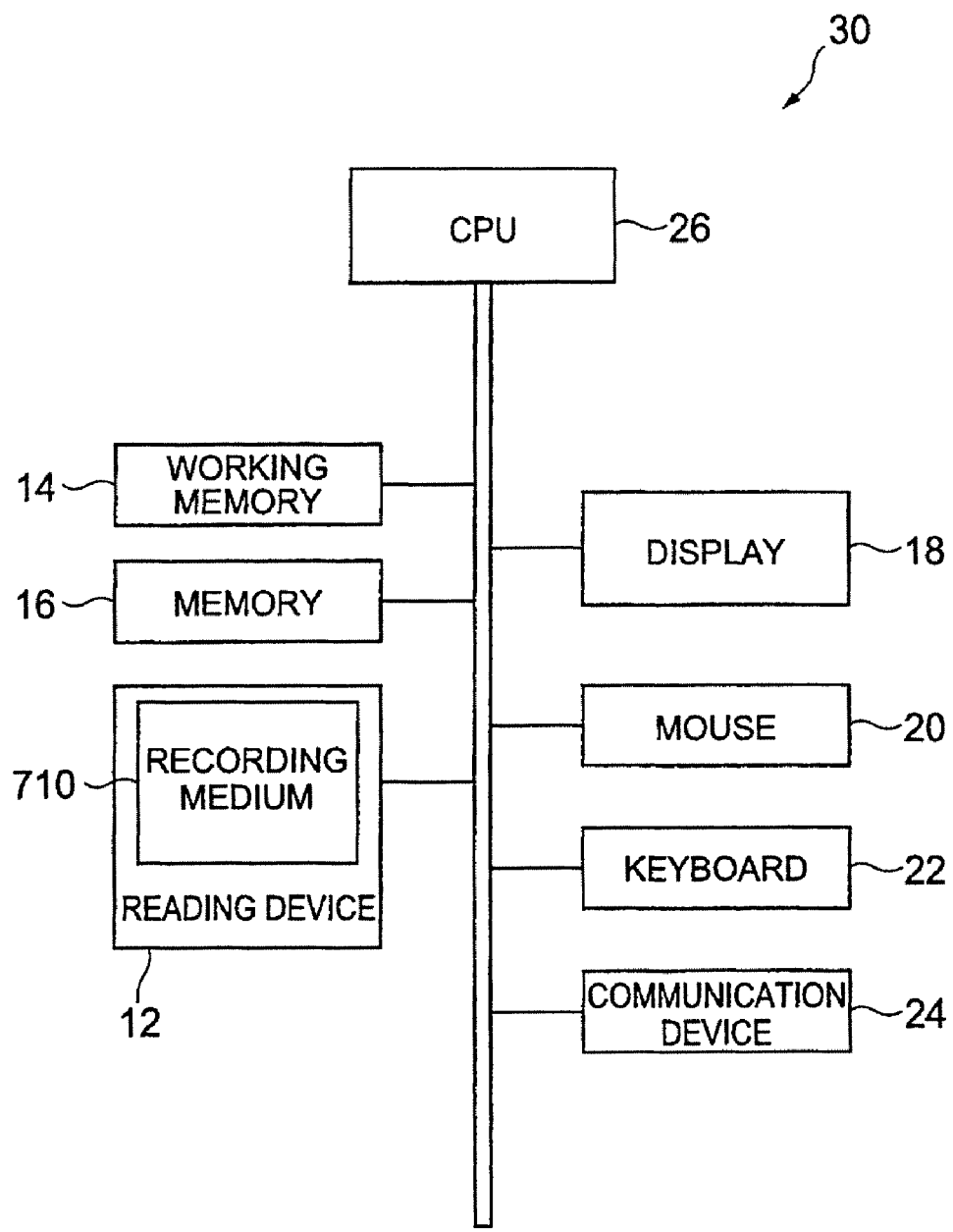
FIG. 8 shows the hardware constitution of a computer for executing the image adjustment amount determination program which is recorded on a recording medium.
Figure 9:
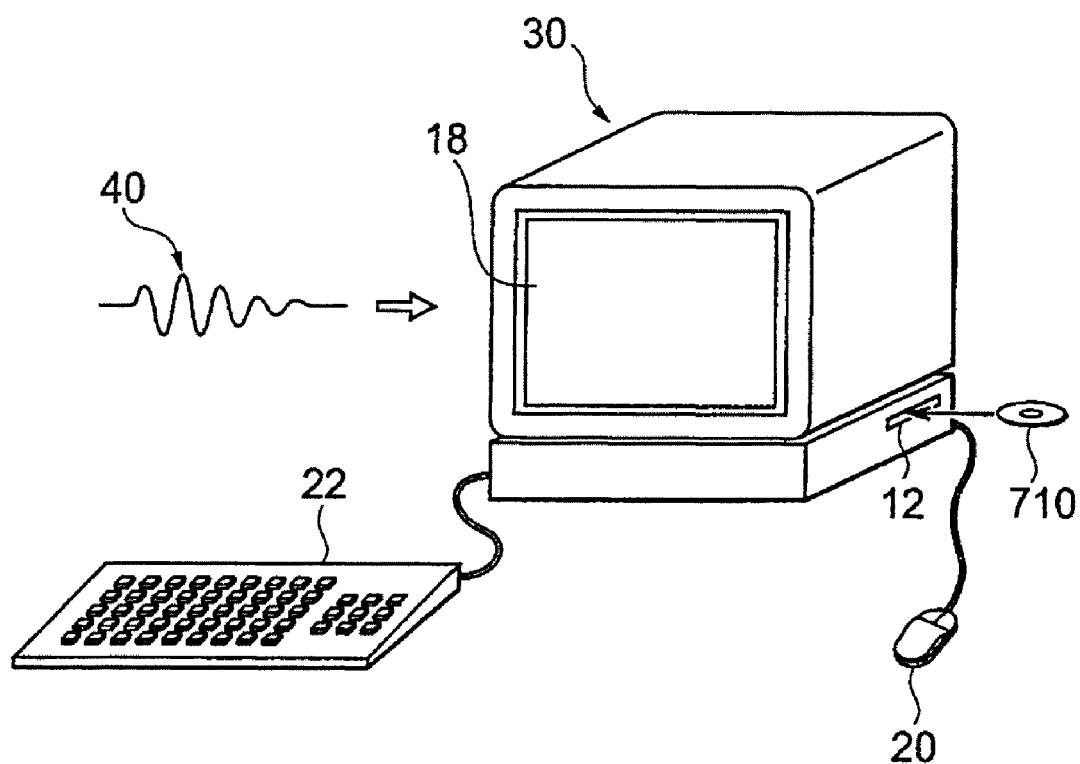
FIG. 9 is a perspective view of a computer for executing the image adjustment amount determination program which is stored on a recording medium.

Furthermore, FIG. 8 shows the hardware constitution of a computer for executing the program which is recorded on the recording medium. FIG. 9 is a perspective view of a computer for executing the program which is stored on the recording medium. The term computer as it is intended here also includes a DVD player, set-top box, or cellular phone that comprises a CPU and which performs processing and control by means of software.

As shown in FIG. 8, a computer 30 is constituted comprising a reading device 12 which is constituted by a floppy disk drive device, a CD-ROM drive device, or a DVD drive device or the like, a working memory (RAM) 14, a memory 16 which is constituted a ROM or the like, a display 18 which is a display device, a mouse 20 and a keyboard 22 which are input devices, a communication device 24 for sending and receiving data and so forth, and a CPU 26 which controls the execution of a program. The computer 30 which is constituted thus comes to operate as the image adjustment amount determination device of the present invention as a result of the fact that, when the recording medium 710 is inserted in the reading device 12, the image adjustment amount determination program P710 stored on the recording medium 710 is read by the reading device 12 and input to the computer 30 and the image adjustment amount determination program P710 is executed by the CPU 26.

As shown in FIG. 9, the image adjustment amount determination program P710 may also be provided via a network as a computer data signal 40 which is superposed on a carrier wave. In this case, the computer 30 stores the image adjustment amount determination program P710 received by the communication device 24 in the memory 16 and the image adjustment amount determination program P710 can be executed by the CPU 26.

The disclosure of Japanese Patent Application No. 2006-320584 filed Nov. 28, 2006 including specification, drawings and claims is incorporated herein by reference in its entirety.

What is claimed is:

1. An image adjustment amount determination device, comprising:
  a processor that:
    receives an input video signal comprising a plurality of frame images;
    divides the input video signal into the plurality of frame images;
    determines a processing target image which is to be the target of image processing and one or more neighboring images which are located in the vicinity of the processing target image in a display order, on the basis of a predetermined criterion from the plurality of frame images;
    calculates average luminance and a size of amplitude of a spatial frequency component for the one or more neighboring images, and a size of amplitude of a spatial frequency component for the processing target image;
    calculates an amount of motion between the processing target image and the one or more neighboring images; and
    determines an adjustment amount of the amplitude of the spatial frequency component for the processing target image on the basis of the average luminance for the one or more neighboring images, the spatial frequency components for the one or more neighboring images and the processing target image, the sizes of the amplitude of the spatial frequency components for the one or more neighboring images and the processing target image, the amount of motion between the processing target image and the one or more neighboring images, and a temporal interval between the processing target image and the one or more neighboring images, wherein
    the determining an adjustment amount includes calling parameters A to G in equation (1) from a parameter storage on the basis of the average luminance (Yave) of the one or more neighboring images (F0), the spatial frequency components (SF) for the one or more neighboring images (F0) and the processing target image (F1), the sizes (P_sf) of the amplitude of the spatial frequency components for the one or more neighboring images (F0) and the processing target image (F1), the amount of motion (V1) between the processing target image (F1) and the one or more neighboring images (F0), the temporal interval (t) between the processing target image (F1) and the one or more neighboring images (F0), and determining the adjustment amount of the amplitude of the spatial frequency components in both horizontal and vertical directions, from the called parameters A to G and equation (1), wherein equation (1) is defined as:

adjustment amount $$(Yave, SF, P_{\_sf}, V1, t) = \frac{A}{1+(\alpha \times SF/\beta)^{2n}} + B \times \exp(-((SF-\gamma1)/C)^2) + D \times \exp(-((SF-\gamma2)/E)^2) + F \times \exp(-((SF-\gamma3)/G)^2),$$

wherein n, $\alpha$, $\beta$, $\gamma1$, $\gamma2$, and $\gamma3$ are constants.

2. The image adjustment amount determination device according to claim 1, wherein the processor compares the size (P_sf (F0)) of the amplitude of the spatial frequency component of the one or more neighboring images (F0) and the size (P_sf (F1)) of the amplitude of the spatial frequency component of the processing target image (F1) in both horizontal and vertical directions, and selects the parameters A to G called from the parameter storage based on whether or not the number of P_sf (F0) greater than P_sf (F1) exceeds a predetermined ratio X % of all the spatial frequency components.

3. The image adjustment amount determination device according to claim 1, wherein the processor determines, as the one or more neighboring images, one or both of an image located before the processing target image in the display order and an image which is located after the processing target image in the display order.

4. The image adjustment amount determination device according to claim 1, wherein the processor determines the adjustment amount represented by a combination of characteristics of two or more different types, as the adjustment amount.

5. An image processing device, comprising:
the image adjustment amount determination device according to claim 1 wherein the processor adjusts the amplitude of the spatial frequency component relating to the processing target image on the basis of the adjustment amount determined by the determining.

6. An image adjustment amount determination method, comprising:
receiving an input video signal comprising a plurality of frame images;
dividing the input video signal into the plurality of frame images;
determining a processing target image which is to be the target of image processing and one or more neighboring images which are located in the vicinity of the processing target image in a display order on the basis of a predetermined criterion from the plurality of frame images;
calculating average luminance and a size of amplitude of a spatial frequency component for the one or more neighboring images, and a size of amplitude of a spatial frequency component for the processing target image;
calculating an amount of motion between the processing target image and the one or more neighboring images; and
determining an adjustment amount of the amplitude of the spatial frequency component for the processing target image on the basis of the average luminance for the one or more neighboring images, the spatial frequency components for the one or more neighboring images and the processing target image, the sizes of the amplitude of the spatial frequency components for the one or more neighboring images and the processing target image, the amount of motion between the processing target image and the one or more neighboring images, and a temporal interval between the processing target image and the one or more neighboring images, wherein determining the adjustment amount includes calling parameters A to G in equation (1) from a parameter storage on the basis of the average luminance (Yave) of the one or more neighboring images (F0), the spatial frequency components (SF) for the one or more neighboring images (F0) and the processing target image (F1), the sizes (P_sf) of the amplitude of the spatial frequency components for the one or more neighboring images (F0) and the processing target image (F1), the amount of motion (V1) between the processing target image (F1) and the one or more neighboring images (F0), and a temporal interval (t) between the processing target image (F1) and the one or more neighboring images (F0), and determining the adjustment amount of the amplitude of the spatial frequency components in both horizontal and vertical directions, from the called parameters A to G and equation (1), wherein equation (1) is defined as:

adjustment amount $$(Yave, SF, P_{\_sf}, V1, t) = \frac{A}{1+(\alpha \times SF/\beta)^{2n}} + B \times \exp(-((SF-\gamma1)/C)^2) + D \times \exp(-((SF-\gamma2)/E)^2) + F \times \exp(-((SF-\gamma3)/G)^2),$$

wherein n, $\alpha$, $\beta$, $\gamma1$, $\gamma2$, and $\gamma3$ are constants.

7. A non-transitory computer-readable medium including computer program instructions, which when executed by a computer, cause the computer to perform an image adjustment amount determination method, the method comprising:
receiving an input video signal comprising a plurality of frame images;
dividing the input video signal into the plurality of frame images;
determining a processing target image which is to be the target of image processing and one or more neighboring images which are located in the vicinity of the processing target image in a display order, on the basis of a predetermined criterion from the plurality of frame images;
calculating average luminance and a size of amplitude of a spatial frequency component for the one or more neighboring images, and a size of amplitude of a spatial frequency component for the processing target image;
calculating an amount of motion between the processing target image and the one or more neighboring images; and
determining an adjustment amount of the amplitude of the spatial frequency component for the processing target image on the basis of the average luminance for the one or more neighboring images, the spatial frequency components for the one or more neighboring images and the processing target image, the sizes of the amplitude of the spatial frequency components for the one or more neighboring images and the processing target image, the amount of motion between the processing target image and the one or more neighboring images, and a temporal interval between the processing target image and the neighboring images, wherein determining the adjustment amount includes calling parameters A to G in equation (1) from a parameter storage on the basis of the average luminance (Yave) of the one or more neighboring images (F0), the spatial frequency components (SF) for the one or more neighboring images (F0) and the processing target image (F1), the sizes (P_sf) of the amplitude of the spatial frequency components for the one or more neighboring images (F0) and the processing target image (F1), the amount of motion (V1) between the processing target image (F1) and the one or more neighboring images (F0), and a temporal interval (t) between the processing target image (F1) and the one or more neighboring images (F0), and determining the adjustment amount of the amplitude of the spatial frequency components in both horizontal and vertical directions, from the called parameters A to G and equation (1), wherein equation (1) is defined as:

adjustment amount $$(Yave, SF, P_{\_sf}, V1, t) = \frac{A}{1 + (\alpha \times SF/\beta)^{2n}} + B \times \exp(-((SF - \gamma 1)/C)^2) + D \times \exp(-((SF - \gamma 2)/E)^2) + F \times \exp(-((SF - \gamma 3)/G)^2),$$

wherein n, α, β, γ1, γ2, and γ3 are constants.

* * * * *